(12) United States Patent
Zolfagharkhani et al.

(10) Patent No.: US 9,651,376 B2
(45) Date of Patent: *May 16, 2017

(54) MICROELECTROMECHANICAL GYROSCOPES AND RELATED APPARATUS AND METHODS

(71) Applicant: Analog Devices, Inc., Norwood, MA (US)

(72) Inventors: Guiti Zolfagharkhani, Brighton, MA (US); Jan H. Kuypers, Rehau (DE); Alexei Gaidarzhy, Brighton, MA (US); David M. Chen, Brookline, MA (US); Pritiraj Mohanty, Los Angeles, CA (US)

(73) Assignee: Analog Devices, Inc., Norwood, MA (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/166,138

(22) Filed: Jan. 28, 2014

(65) Prior Publication Data

US 2014/0137648 A1   May 22, 2014

Related U.S. Application Data

(63) Continuation of application No. 13/038,000, filed on Mar. 1, 2011, now Pat. No. 8,661,899.

(60) Provisional application No. 61/309,351, filed on Mar. 1, 2010.

(51) Int. Cl.
 *G01C 19/56* (2012.01)
 *G01C 19/5712* (2012.01)

(52) U.S. Cl.
 CPC ......... *G01C 19/56* (2013.01); *G01C 19/5712* (2013.01)

(58) Field of Classification Search
 CPC .................................................. G01C 19/5712
 USPC ...................................................... 73/504.12
 See application file for complete search history.

(56) References Cited

U.S. PATENT DOCUMENTS

| | | | |
|---|---|---|---|
| 4,278,492 A | 7/1981 | Cross | |
| 4,364,016 A | 12/1982 | Tanski | |
| 4,395,849 A | 8/1983 | Kasai et al. | |
| 4,442,574 A | 4/1984 | Wanuga | |

(Continued)

FOREIGN PATENT DOCUMENTS

| | | |
|---|---|---|
| EP | 0 375 360 A2 | 6/1990 |
| EP | 0 706 053 A1 | 4/1996 |

(Continued)

OTHER PUBLICATIONS

International Preliminary Report on Patentability and Written Opinion for Application No. PCT/US2006/021298 mailed Dec. 6, 2007 and Nov. 6, 2006 respectively.

(Continued)

*Primary Examiner* — John Chapman, Jr.
(74) *Attorney, Agent, or Firm* — Wolf, Greenfield & Sacks, P.C.

(57) ABSTRACT

In one embodiment, an apparatus comprises a micromechanical gyroscope and a circuit. The micromechanical gyroscope is configured to be excited in a first mode by a drive signal, and configured to be excited in a second mode by a gyroscopic effect. The circuit is coupled to the micromechanical gyroscope and configured to detect the gyroscopic effect when the micromechanical gyroscope is in the second mode.

20 Claims, 14 Drawing Sheets

(56) References Cited

U.S. PATENT DOCUMENTS

| | | | |
|---|---|---|---|
| 4,454,639 A | 6/1984 | Dworsky |
| 4,538,461 A | 9/1985 | Juptner et al. |
| 4,631,197 A | 12/1986 | Defreese |
| 4,655,081 A | 4/1987 | Burdess |
| 4,750,364 A | 6/1988 | Kawamura et al. |
| 5,226,321 A | 7/1993 | Varnham et al. |
| 5,416,447 A | 5/1995 | Andres |
| 5,438,231 A | 8/1995 | Khoshnevisan et al. |
| 5,501,103 A | 3/1996 | Woodruff et al. |
| 5,677,485 A | 10/1997 | Nakamura |
| 5,679,896 A | 10/1997 | Nakamura et al. |
| 5,736,640 A | 4/1998 | Farine et al. |
| 5,824,903 A | 10/1998 | Nakamura et al. |
| 5,889,208 A | 3/1999 | Nose |
| 5,913,244 A | 6/1999 | Heinouchi |
| 5,914,553 A | 6/1999 | Adams |
| 5,939,956 A | 8/1999 | Arimura |
| 5,969,249 A | 10/1999 | Roessig et al. |
| 6,121,856 A | 9/2000 | Apostolos |
| 6,124,765 A | 9/2000 | Chan |
| 6,209,393 B1 | 4/2001 | Tomikawa et al. |
| 6,420,820 B1 | 7/2002 | Larson |
| 6,453,744 B2 | 9/2002 | Williams |
| 6,577,040 B2 | 6/2003 | Nguyen |
| 6,595,054 B2 | 7/2003 | Paros et al. |
| 6,739,190 B2 | 5/2004 | Hsu |
| 6,745,627 B1 | 6/2004 | Woodruff et al. |
| 6,828,713 B2 | 12/2004 | Bradley |
| 6,831,531 B1 | 12/2004 | Giousouf |
| 6,859,113 B2 | 2/2005 | Giousouf |
| 6,909,221 B2 | 6/2005 | Ayazi |
| 6,943,484 B2 | 9/2005 | Clark |
| 6,954,020 B2 | 10/2005 | Ma |
| 6,975,184 B2 | 12/2005 | Wang |
| 6,987,432 B2 | 1/2006 | Lutz |
| 6,995,622 B2 | 2/2006 | Partridge |
| 7,005,946 B2 | 2/2006 | Duwel |
| 7,024,934 B2 | 4/2006 | Yu |
| 7,068,125 B2 | 6/2006 | Lutz |
| 7,102,467 B2 | 9/2006 | Lutz |
| 7,138,889 B2 | 11/2006 | Lakin |
| 7,170,369 B2 | 1/2007 | Huang |
| 7,211,926 B2 | 5/2007 | Quevy |
| 7,215,061 B2 | 5/2007 | Kihara |
| 7,248,128 B2 | 7/2007 | Mattila |
| 7,310,029 B2 | 12/2007 | Robert |
| 7,327,070 B2 | 2/2008 | Tanaka |
| 7,352,608 B2 | 4/2008 | Mohanty |
| 7,492,241 B2 | 2/2009 | Piazza |
| 7,504,909 B2 | 3/2009 | Tada |
| 7,528,685 B2 | 5/2009 | Tanaka |
| 7,535,152 B2 | 5/2009 | Ogami |
| 7,561,009 B2 | 7/2009 | Larson |
| 7,724,103 B2 | 5/2010 | Feng |
| 7,741,752 B2 | 6/2010 | Shih et al. |
| 7,791,432 B2 | 9/2010 | Piazza |
| 7,812,692 B2 | 10/2010 | Ayazi |
| 7,868,517 B2 | 1/2011 | Belot |
| 7,950,281 B2 | 5/2011 | Hammerschmidt |
| 7,954,377 B2 | 6/2011 | Higuchi et al. |
| 7,965,015 B2 | 6/2011 | Tai |
| 8,058,769 B2 | 11/2011 | Chen et al. |
| 8,395,456 B2 | 3/2013 | Badillo et al. |
| 8,487,715 B2 | 7/2013 | Mohanty et al. |
| 8,661,899 B2 * | 3/2014 | Zolfagharkhani . G01C 19/5712 73/504.12 |
| 8,833,161 B2 | 9/2014 | Zolfagharkhani et al. |
| 2002/0075100 A1 | 6/2002 | Katohno |
| 2002/0158700 A1 | 10/2002 | Nemoto |
| 2003/0034852 A1 | 2/2003 | Kobayashi |
| 2003/0066350 A1 | 4/2003 | Machida |
| 2003/0146674 A1 | 8/2003 | Jacob |
| 2004/0056728 A1 | 3/2004 | Dent |
| 2004/0239450 A1 | 12/2004 | Wang |
| 2004/0250621 A1 | 12/2004 | Fujimoto |
| 2005/0073078 A1 | 4/2005 | Lutz |
| 2005/0110598 A1 | 5/2005 | Larson |
| 2005/0284222 A1 | 12/2005 | Johnson |
| 2006/0117852 A1 | 6/2006 | Park |
| 2006/0283246 A1 | 12/2006 | Weinberg et al. |
| 2007/0188047 A1 | 8/2007 | Tanaka |
| 2007/0222336 A1 | 9/2007 | Grannen |
| 2008/0048804 A1 | 2/2008 | Volatier |
| 2008/0087083 A1 | 4/2008 | Nishizawa |
| 2008/0115579 A1 | 5/2008 | Seeger et al. |
| 2008/0143217 A1 | 6/2008 | Ho |
| 2008/0196498 A1 | 8/2008 | Suzuki |
| 2008/0204153 A1 | 8/2008 | Yoshida |
| 2008/0272852 A1 | 11/2008 | Six |
| 2008/0284286 A1 | 11/2008 | Ogawa |
| 2008/0297281 A1 | 12/2008 | Ayazi |
| 2009/0026882 A1 | 1/2009 | Steeneken |
| 2009/0108381 A1 | 4/2009 | Buchwalter |
| 2009/0108959 A1 | 4/2009 | Piazza |
| 2009/0144963 A1 | 6/2009 | Piazza |
| 2009/0243747 A1 | 10/2009 | Gaidarzhy |
| 2009/0255338 A1 | 10/2009 | Watanabe |
| 2009/0294638 A1 | 12/2009 | Mohanty |
| 2010/0007443 A1 | 1/2010 | Mohanty |
| 2010/0026136 A1 | 2/2010 | Gaidarzhy |
| 2010/0038991 A1 | 2/2010 | Shih |
| 2010/0134207 A1 | 6/2010 | Mohanty |
| 2010/0155883 A1 | 6/2010 | Wenzler |
| 2010/0181868 A1 | 7/2010 | Gaidarzhy |
| 2010/0182102 A1 | 7/2010 | Kuypers |
| 2010/0237959 A1 | 9/2010 | Tanaka |
| 2015/0214462 A1 | 7/2015 | Zolfagharkhani et al. |

FOREIGN PATENT DOCUMENTS

| | | |
|---|---|---|
| EP | 0 707 212 A2 | 4/1996 |
| EP | 0 791 832 A1 | 8/1997 |
| EP | 1 505 722 A2 | 2/2005 |
| WO | WO 98/01948 A1 | 1/1998 |
| WO | WO 98/37635 A1 | 8/1998 |
| WO | WO 02/17481 A2 | 2/2002 |
| WO | WO 2006/000611 A1 | 1/2006 |
| WO | WO 2006/083482 A2 | 8/2006 |
| WO | WO 2006/130777 A2 | 12/2006 |
| WO | WO 2007/072408 A2 | 6/2007 |
| WO | WO 2007/072409 A2 | 6/2007 |
| WO | WO 2007/143520 A2 | 12/2007 |
| WO | WO 2010/011288 A1 | 1/2010 |

OTHER PUBLICATIONS

International Search Report and Written Opinion mailed Feb. 26, 2010 for Application No. PCT/US2009/006587.

International Preliminary Report on Patentability mailed Jun. 30, 2011 for Application No. PCT/US2009/006587.

International Search Report and Written Opinion mailed Mar. 1, 2010 for Application No. PCT/US2009/006590.

International Preliminary Report on Patentability mailed Jun. 30, 2011 for Application No. PCT/US2009/006590.

International Search Report and Written Opinion mailed Sep. 3, 2010 for Application No. PCT/US2010/000301.

International Preliminary Report on Patentability mailed Aug. 18, 2011 for Application No. PCT/US2010/000301.

International Search Report and Written Opinion mailed Apr. 29, 2011 for Application No. PCT/US2011/026668.

International Preliminary Report on Patentability mailed Sep. 13, 2012 for Application No. PCT/US2011/026668.

Di Pietrantonio et al., Guided lamb wave electroacoustic devices on micromachined AlN/Al plates. IEEE Trans Ultrason Ferroelectr Freq Control. May 2010;57(5):1175-82. doi: 10.1109/TUFFC.2010.1530.

Driscoll, Linear Frequency Tuning of SAW Resonators. IEEE Trans Ultrason Ferroelectr Freq Control. 1991;38(4):366-9.

Driscoll et al., Voltage-Controlled Crystal Oscillators. IEEE Transactions on Electron Devices. Aug. 1971;18(8):528-35.

(56) References Cited

OTHER PUBLICATIONS

Humad et al., High Frequency Micromechanical Piezo-on-Silicon Block Resonators. International Electron Devices Meeting. Washington, D.C. Dec. 8-10, 2003, New York, NY IEEE US Dec. 8, 2003. Technical Digest. 957-60.

Kadota et al., High-frequency Lamb wave device composed of MEMS structure using LiNbO3 thin film and air gap. IEEE Trans Ultrason Ferroelectr Freq Control. Nov. 2010;57(11):2564-71. doi: 10.1109/TUFFC.2010.1722.

Onoe, Several Extensions of Mindlin-Gazis's Analysis of Rotated Y-Cut of Quartz (Invited). Frequency Control Symposium, 2008 IEEE International. Honolulu, HI, May 19-21, 2008. 10-8.

Parker, Precision Surface-Acoustic-Wave (Saw) Oscillators. IEEE Transactions on Ultrasonics, Ferroelectrics, and Frequency Control. May 1988;35(3):342-64.

Piazza et al., Low Motional Resistance Ring-Shaped Contour-Mode Aluminum Nitride Piezoelectric Micromechanical Resonators for UHF Applications. 18th IEEE International Conference on Micro Electro Mechanical Systems, 2005. MEMS 2005. Miami Beach, Florida. Jan. 30-Feb. 3, 2005;20-3. doi: 10.1109/MEMSYS.2005.1453857.

Reinhardt et al., Simulation of Baw Resonators Frequency Adjustment. IEEE 2007 Ultrasonics Symposium. New York, NY. Oct. 28-31, 2007;1444-7. doi: 10.1109/ULTSYM.2007.363.

Tirole et al., Lamb Waves Pressure Sensor Using an AIN/Si Structure. Proceedings of IEEE 1993 Ultrasonics Symposium. Baltimore, MD. Oct. 31-Nov. 3, 1993;1:371-4. doi: 10.1109/ULTSYM.1993.339466.

Uno, Frequency Trimming of Saw Devices. Proceedings of IEEE 1994 Ultrasonics Symposium. Cannes, France. Oct. 31-Nov. 3, 1994;1:181-7. doi: 10.1109/ULTSYM.1994.401576.

Wang et al., In-Situ Frequency Trimming of Saw Resonator Using Conventional Crystal Resonator Fine Tuning Method With Gold Thin Film Addition. 2003 IEEE Symposium on Ultrasonics. Oct. 5-8, 2003;2:1730-3. doi: 10.1109/ULTSYM.2003.1293245. 4 pages.

Wang et al., Method of Fabricating Multiple-Frequency Film Bulk Acoustic Resonators in a Single Chip. 2006 IEEE International Frequency Control Symposium and Exposition. Miami, FL. Jun. 2006;793-6.

Wang et al., The Analysis of the Third-Order Thickness-Shear Overtone Vibrations of Quartz Cristal Plates With Mindlin Plate Theory. 2008 IEEE International Ultrasonics Symposium Proceedings. Beijing, China. Nov. 2-5, 2008;2173-6. doi: 10.1109/ULTSYM.2008.0538.

Wingqvist et al., A Micromachined Thermally Compensated Thin Film Lamb Wave Resonator for Frequency Control and Sensing Applications. J Micromech Microeng. 2009;19(3):035018. doi: 10.1088/0960-1317/19/3/035018. 9 pages.

Yatsuda et al., Flip-Chip Stw Filters and Frequency Trimming Method. 2002 IEEE International Frequency Control Symposium and PDA Exhibition. 2002; 366-9. doi: 10.1109/FREQ.2002.1075910.

International Search Report and Written Opinion mailed Sep. 14, 2011 for Application No. PCT/US2011/033268.

International Preliminary Report on Patentability mailed Nov. 1, 2012 for Application No. PCT/US2011/033268.

\* cited by examiner

MICROELECTROMECHANICAL GYROSCOPES AND RELATED APPARATUS AND METHODS

CROSS-REFERENCE TO RELATED APPLICATIONS

This application is a continuation of U.S. patent application Ser. No. 13/038,000 filed Mar. 1, 2011, which claims priority to U.S. Provisional Patent Application Ser. No. 61/309,351, filed Mar. 1, 2010, the disclosures of both of which are incorporated herein by reference in their entirety.

BACKGROUND OF THE DISCLOSURE

Some embodiments described herein relate generally to micromechanical structures that can detect angular rates and are sensitive, robust and insensitive to temperature. In particular, some embodiments can use two vibrational modes of a resonating structure where the first mode is used as the excitation mode, and the gyroscopic effect causes the excitation of the second mode, which can be detected by a circuit having an output proportional to the angular rate about a given axis.

Gyroscopes are of interest for navigation systems, motion control of robots and automated manufacturing, entertainment electronics, and medical applications. A gyroscopic sensor measures the angular rate .omega. around one or several defined axes, being x, y, or z, and produces a voltage at the sensor output that is proportional to the angular rate.

A gyroscope can use a variety of sensor effects, i.e. optical, electrical, acoustic, and mechanical.

The simplest design for a known gyroscope exploiting a mechanical sensor effect is to use a cantilever clamped at one end having a square cross-section. The cantilever is excited to vibrate up and down. If there is a rotation around the center of the cantilever it will start to vibrate left and right. The amplitude of this secondary vibration from left to right can be measured and is proportional to the angular rate.

The difficulties for a known gyroscope, however, include sensitivity towards acceleration, vibration, shock, drift of the sensor, temperature sensitivity, cross-coupling of the two ideally orthogonal modes etc. Thus, a need exists for improved gyroscopes.

SUMMARY

In one embodiment, an apparatus comprises a micromechanical gyroscope and a circuit. The micromechanical gyroscope is configured to be excited in a first mode by a drive signal, and configured to be excited in a second mode by a gyroscopic effect. The circuit is coupled to the micromechanical gyroscope and configured to detect the gyroscopic effect when the micromechanical gyroscope is in the second mode.

BRIEF DESCRIPTION OF THE DRAWINGS

FIG. 2a is illustrated for the first half of a cycle of the vibration of this mode, and FIG. 2b is illustrated for the second half of the cycle of the vibration of this mode, according to an embodiment.

FIG. 3a shows the in-plane contraction of the structure during the first half of the cycle of vibration of this mode and FIG. 3b shows the expansion during the second half of the cycle of vibration of this mode.

DETAILED DESCRIPTION OF THE DRAWINGS

In some embodiments, a substrate has a plate and two electrodes. In other embodiments, a substrate has a first plate and a second plate (also referred to cantilevers). The first plate and the second plate collectively can have a first mode when excited by a drive signal and can have a second mode when excited by a gyroscopic effect.

Figure 1:
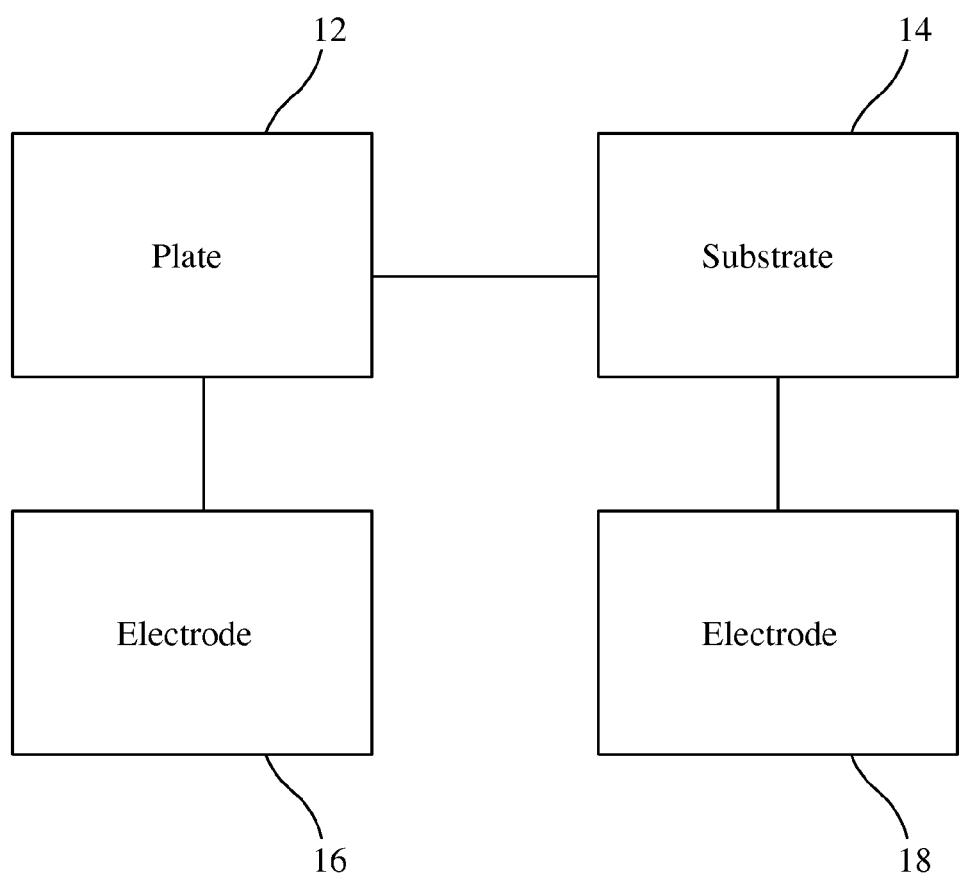
FIG. 1 shows a system block diagram of a micromechanical gyroscope, according to an embodiment.

FIG. 1 shows a system block diagram of a micromechanical gyroscope, according to an embodiment. As shown in FIG. 1, the micromechanical gyroscope 10 includes a plate 12, a substrate 14 and electrodes 16 and 18. In this example, electrode 16 are located at and mechanically connected to plate 12; electrode 18 is located at substrate 16. The plate 14 and substrate 14 are connected or attached together.

As FIG. 1 illustrates, the micromechanical gyroscope can take different forms. Although in some embodiments, the plate(s) is described as a cantilever(s), it should be understood that other plate-like structure(s) are possible. For example, in other embodiments, a structure(s) can be clamped, coupled, attached or anchored to the substrate on both ends of that structure. In yet other embodiments, a structure can be coupled, attached or anchored to the substrate on either side of the structure while leaving the ends unattached. In sum, the structure(s) (also referred to as a plate(s), member(s), bar(s) and/or cantilever(s)) can be connected to the substrate in any appropriate manner that allows extensional and flexure modes along a predominant axis to be maintained.

As used in this specification, the singular forms "a," "an" and "the" include plural referents unless the context clearly dictates otherwise. Thus, for example, the term "a plate" is intended to mean a single plate or a combination of plates.

Figure 2A:
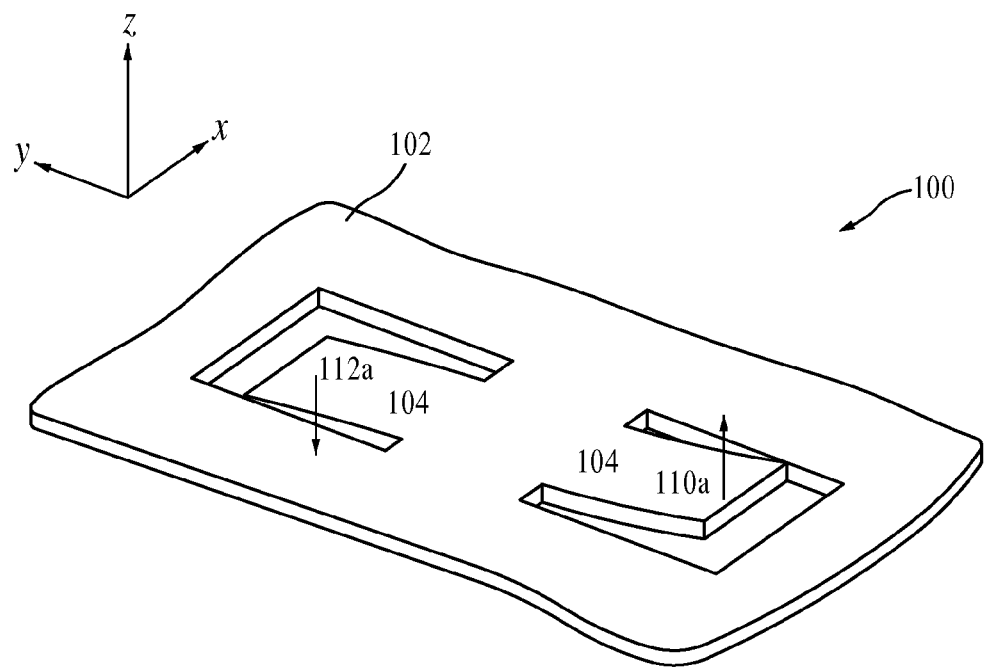
FIGS. 2a and 2b show perspective views of a structure having the first of the two orthogonal modes used for a gyroscope, the out-of-plane mode, where
Figure 2B:
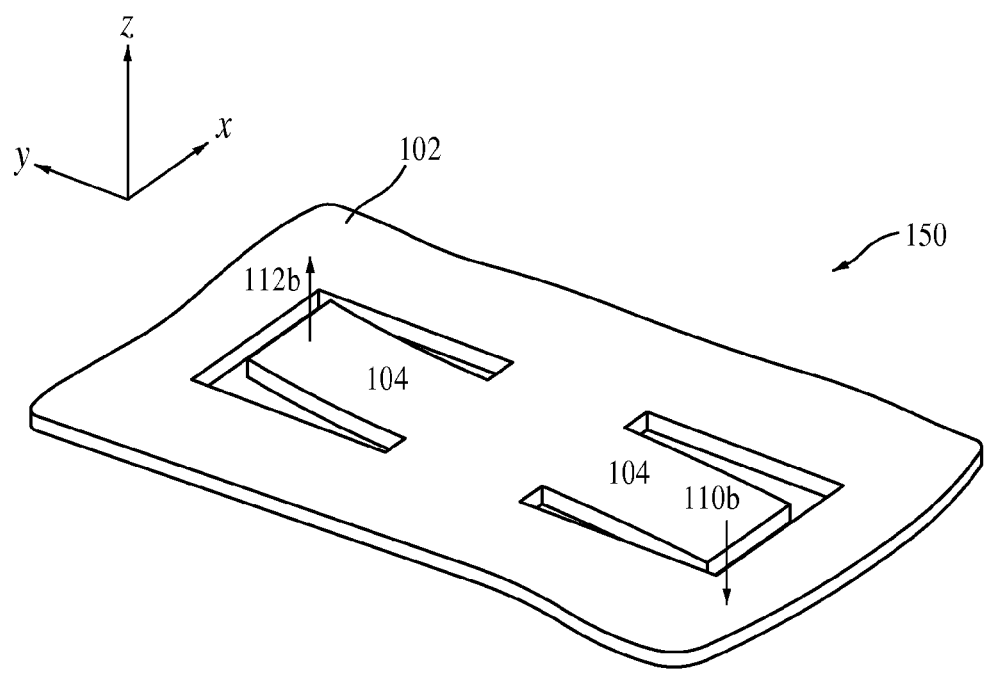

A gyroscopic structure 100 is shown in FIG. 2a. Two substantially identical cantilevers 104 are formed in close vicinity. In some embodiments, the vicinity can be chosen to be very small as to obtain mechanical coupling. It should be understood that different arrangements of the cantilevers are possible. In one embodiment, the cantilevers are in the parallel alignment. The suspended cantilevers 104 are connected to a substrate 102. The suspended cantilevers 104 can be made of, for example, silicon or silicon oxide. One possible mechanical vibration mode of this structure is an anti-symmetric flexural out-of-plane mode of the two cantilevers, indicated by the arrows 110a and 112a. For example, the two cantilevers 104 can flex substantially 180 degrees out of phase from each other when the cantilevers 104 are excited in the vibration mode. The vibration of the cantilevers for the other half cycle is illustrated in FIG. 2b. The arrows indicate the flexure of the cantilevers according to the arrows 110b and 112b.

Figure 3A:
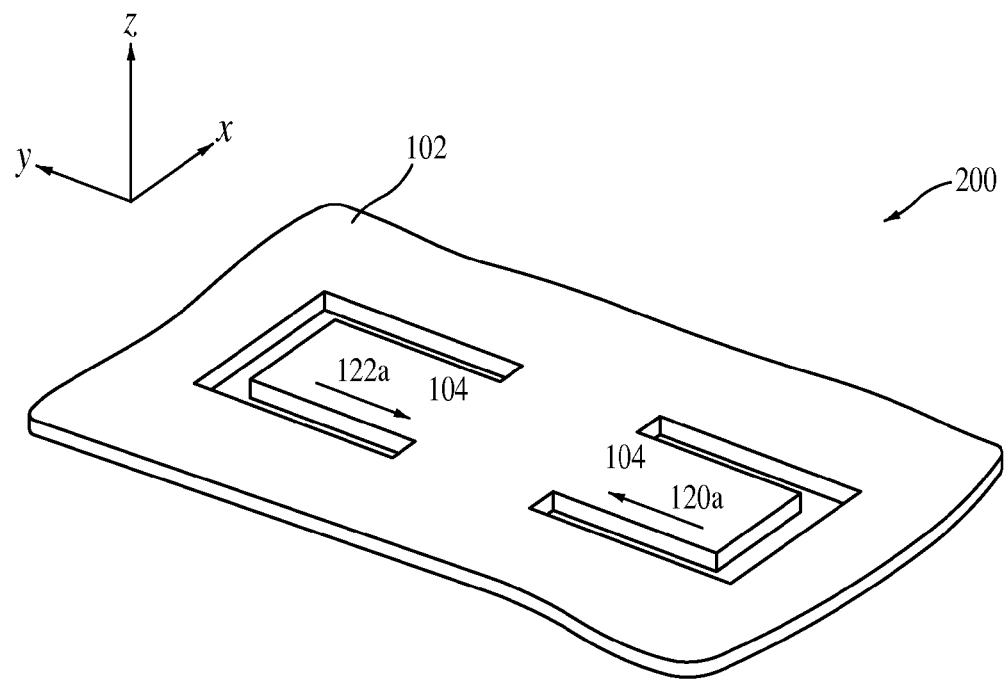
FIGS. 3a and 3b show perspective views of the structure of FIGS. 2a and 2b having the second mode, an in-plane mode, where

Another motion supported by the suspended cantilevers is illustrated in FIG. 3a. The arrows 120a and 122a illustrate the cantilever motion, resembling an extensional mode. In this example, the two cantilevers 104 can extend substantially 180 degrees out of phase from each other when the cantilevers 104 are excited in the extensional mode. On the second half cycle of the motion, the cantilevers expand according to the arrows 120b and 122b.

Figure 4A:
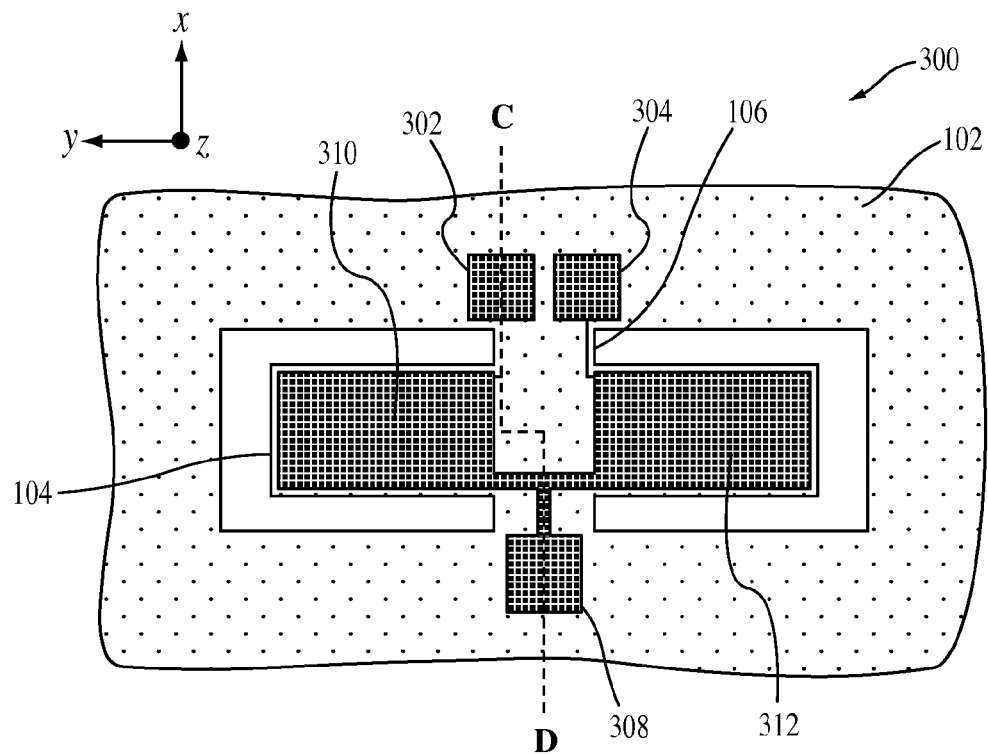
FIGS. 4a and 4,b show a top-view of a structure having a piezoelectric thin film to excite the modes illustrated in FIGS. 2a and 2b and FIGS. 3a and 3b, respectively, according to another embodiment.
Figure 5A:
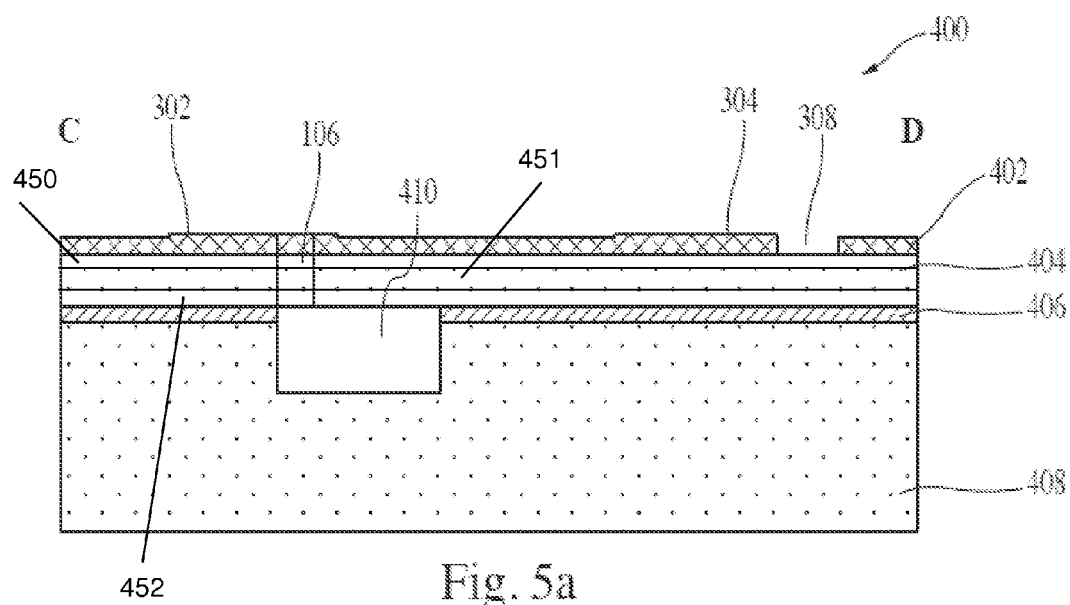
FIGS. 5a and 5b show a cross-section of the structures shown in the FIGS. 4a, and 4b, respectively.
Figure 5B:
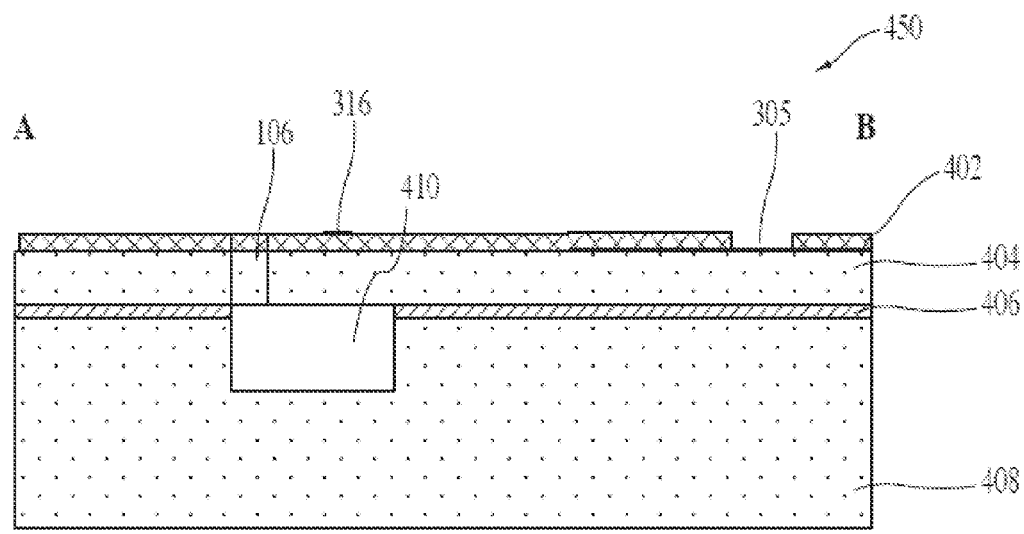

FIG. 4a shows the top view of one embodiment of how the flexural out-of-plane mode illustrated in FIGS. 1a and 1b can be excited. The cross-section of this device is shown in FIG. 5a. In this embodiment, a piezoelectric thin film 402 is on top of another layer 404. This layer 404 can be composed of one or more layers, and can include a temperature-compensated stack, for example of the type described with respect to temperature-compensated resonating structures in U.S. patent application Ser. No. 12/639,161, filed on Dec. 16, 2009, now U.S. Pat. No. 8,058,769 and entitled "Mechanical Resonating Structures Including a Temperature Compensation Structure" which is hereby incorporated herein by reference in its entirety. As described in the '769 patent, the compensating structure may include one or more layers. The first layer 450 can have characteristics that are selected so that it has a positive TCS (i.e., TCS>0) over a temperature range. For example, the composition of the first layer 450 may be selected to provide a positive TCS. Suitable compositions can include $SiO_2$ and $Al_2O_3$, amongst others. In some cases, $SiO_2$ may be preferred. In some cases, the first layer 450 may be composed of a series of ultra-thin layers (e.g., less than 10 nm thick) which are combined to produce an overall layer having a positive TCS. The positive TCS may also, or alternatively, be engineered by implanting species (e.g., ions, neutrons) in the first layer. Thus, it should be understood that a layer exhibiting a positive TCS may be obtained in any of a number of suitable ways, and that the various aspects described herein including one of more layers exhibiting a positive TCS are not limited in the manner in which the positive TCS is obtained. In some cases, the TCS is positive across the entire operating temperature range of the device. For example, the TCS may be positive across the temperature range of between −55° C. and 150° C., or between −40° C., and 85° C. However, in other cases, the TCS of first layer 450 may be positive across a portion of the operating range, and negative across other portion(s). The TCS of the first layer may be positive across the majority of the temperature range. In some embodiments, the TCS of the first layer may be positive across a range of at least 200° C., in some embodiments, at least 100° C.; and, in other embodiments, at least 50° C. A second layer may be a support layer that provides robustness to the first layer 450. The second layer 451 may be formed of a material having a lower acoustical loss than the material of the first layer 450. In some embodiments, the second layer is formed of a material having a certain crystal structure. For example, the second layer may be formed of a single crystal material and/or a material having higher crystal quality than the material of the first layer 450 (e.g., lower defects). In particular, when the first layer 450 comprises $SiO_2$, the robustness and support provided by the second layer is useful, since a structure comprised of a thin $SiO_2$ layer(s) and the active layer can be fragile and prone to damage if subjected to forceful mechanical movements or vibrations. The second layer 451 can also provide improved signal performance (E.G., less noise and better Q-factor). Suitable materials for the second layer include silicon, diamond, silicon carbide, sapphire, quartz, germanium, aluminum nitride, and gallium arsenide, amongst others. In some embodiments, it is preferable for the second layer 451 to be formed of silicon. In another embodiment, the compensating structure includes a third layer. In some cases, the third layer may be formed of a material having a positive TCS. Suitable materials having a positive TCS were described above in connection with the first layer. In some embodiments, the third layer 452 comprises the same material as first layer 450. However, in other embodiments, the third layer 452 may comprise a different material than the first layer 450 (and the second layer 451). In some embodiments, layers are formed of $SiO_2$ layers. In some of these cases, the second layer 451 is formed of Si. The second layer 451 is positioned between the first layer 450 and the third layer 452. Other arrangements are possible. Alternatively, this layer 404 can be of a single material and can include a second piezoelectric layer. The piezoelectric thin film is deposited on top of a conductive layer 406 that is connected to the pad 308. The piezoelectric layer and/or the piezoelectric thin layer can be made of any appropriate piezoelectric material including, for example, aluminum nitride, zinc oxide, lead zicronate titanate (PZT), lithium niobate ($LiNbO_3$), potassium niobate ($KNbO_3$), lithium tantanate ($LiTaO_3$), quartz, BST (Ba Sr $TiO_3$, barium strontium titanate) and/or MNT (Mn Nb $TiO_3$, Manganese niobium tianate). In some embodiments, each electrode 310 and 312 can be disposed between separate piezoelectric layers. In yet other embodiments, the surface, parts or the entire layer 404 can be conductive and can be used instead of this additional conductive layer.

The plate structure is suspended mechanically from the substrate 408 by using either a cavity 410 below the device surface, performing a backside etch, using a sacrificial layer or using a front-side under-etch of the cantilevers 104.

By applying a voltage (also referred to as a "drive signal") between the respective electrodes 310 and 312 and the bottom electrode 308, the piezoelectric layer can contract or expand based on the inverse piezoelectric effect.

In this embodiment, the bottom electrode 308 will be connected to ground. Applying, for example, a positive voltage to the top electrode 310 via the pad 302, the piezoelectric layer 402 contracts. As this film is clamped on the layer 404 the contraction causes the plate to deflect out of plane. By applying a negative voltage on the other top electrode 312 causes the other side of the plate to deflect downwards. As a result, this actuation causes a motion similar to the illustration in FIGS. 2a and 2b.

Figure 3B:
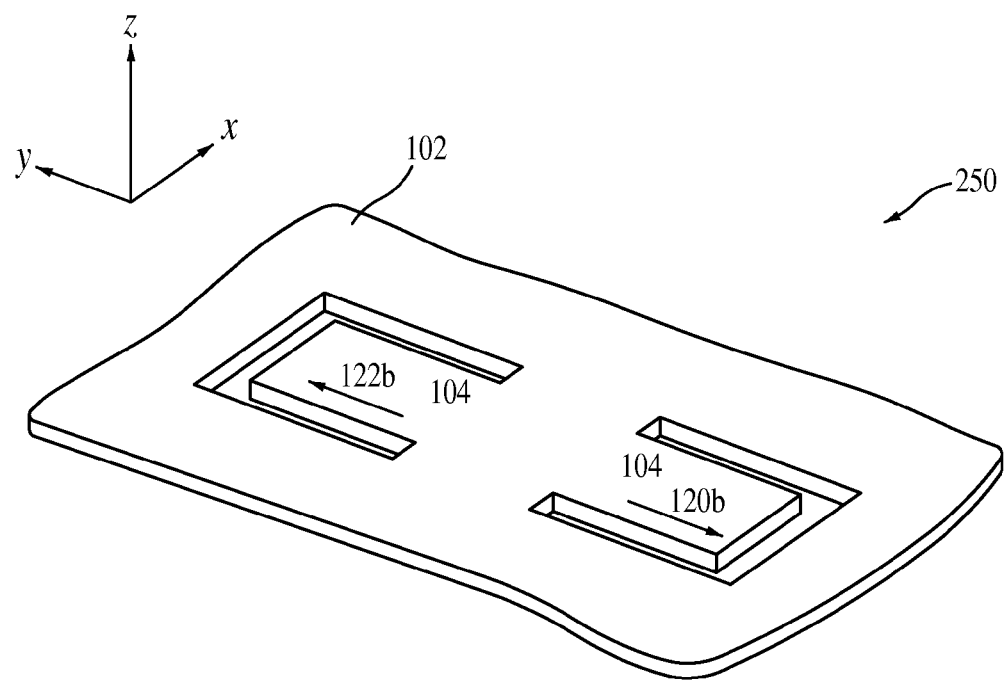
Figure 4B:
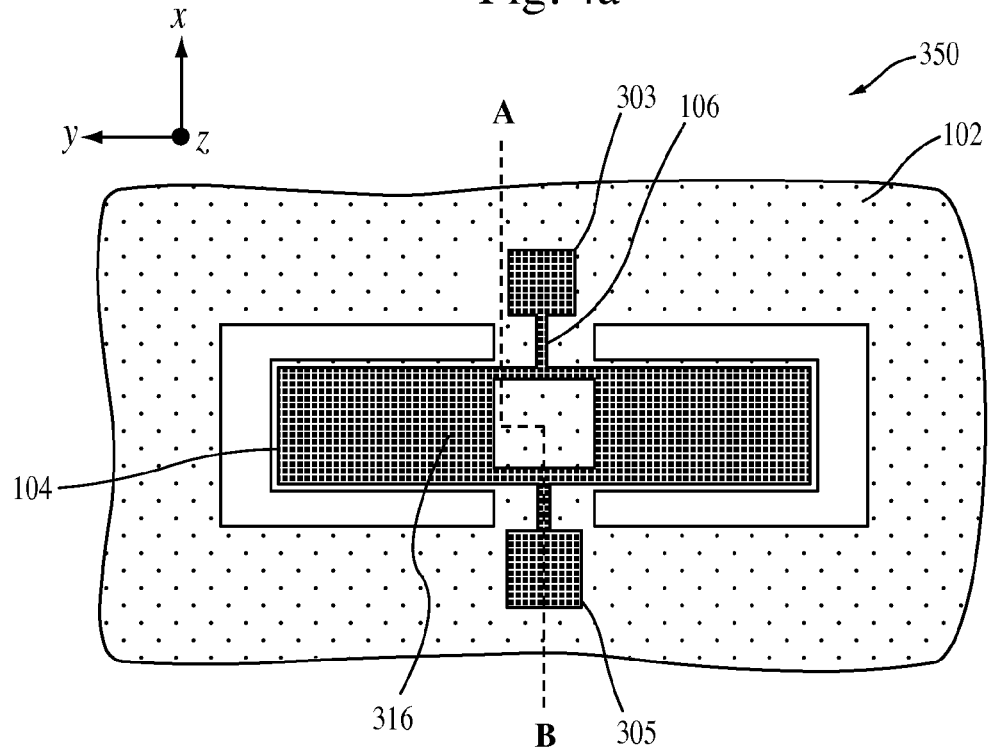

In FIG. 4b the top electrode 316 is not separated, but is otherwise similar to the concept discussed in regards to FIG. 4a. For this embodiment, electrode 305 is connected to ground. By applying a positive voltage to the top electrode 316 via the pad 303 the piezoelectric layer contracts and the underlying layer 404 clamped to the piezoelectric layer contracts at the same time. If a negative voltage is applied, the piezoelectric layer expands and causes the underlying layer to expand too. The resulting motion therefore resembles the motion described in FIGS. 3a and 3b.

Figure 6A:
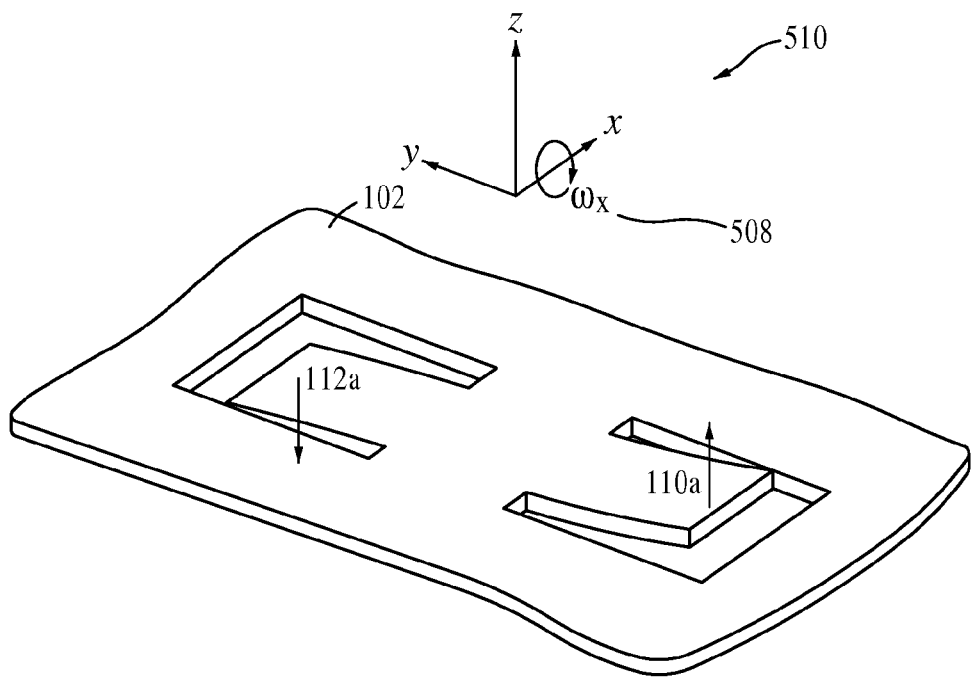
FIGS. 6a-6d show perspective views of a structure during an operational sequence using the out-of-plane mode as the exciting mode, according to an embodiment.
Figure 6B:
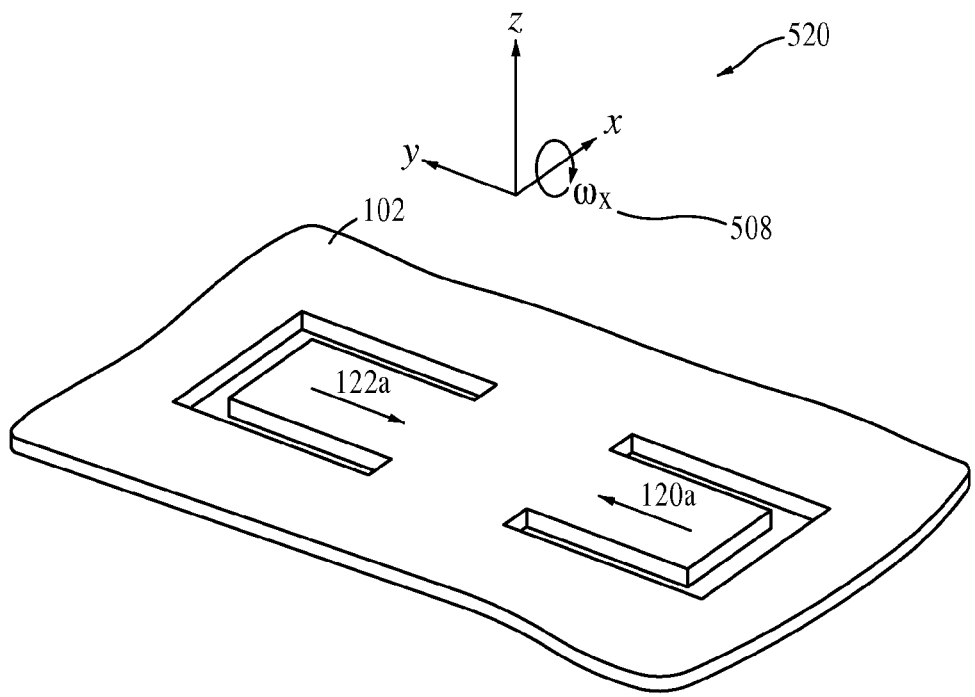

FIGS. 6a through 6d describe the sequence of using the two modes illustrated in FIGS. 2a and 2b and FIGS. 3a and 3b for a gyroscope. Assuming the structure 100 in FIG. 2a and angular rate $\infty_x$ 508 about the x-axis. The initial mode having an upward displacement 110a of the right cantilever and downward displacement 112a of the left cantilever. The right cantilever will experience the Coriolis force resulting from the upwards motion 110a and the angular rotation $\infty_x$ 508, that causes the cantilever to experience a contracting force, illustrated in FIG. 6b by 120a. For the left cantilever the displacement 112a together with the angular rate $\infty_x$ 508 cause a contraction, as illustrated in FIG. 6b by 122a.

Figure 6C:
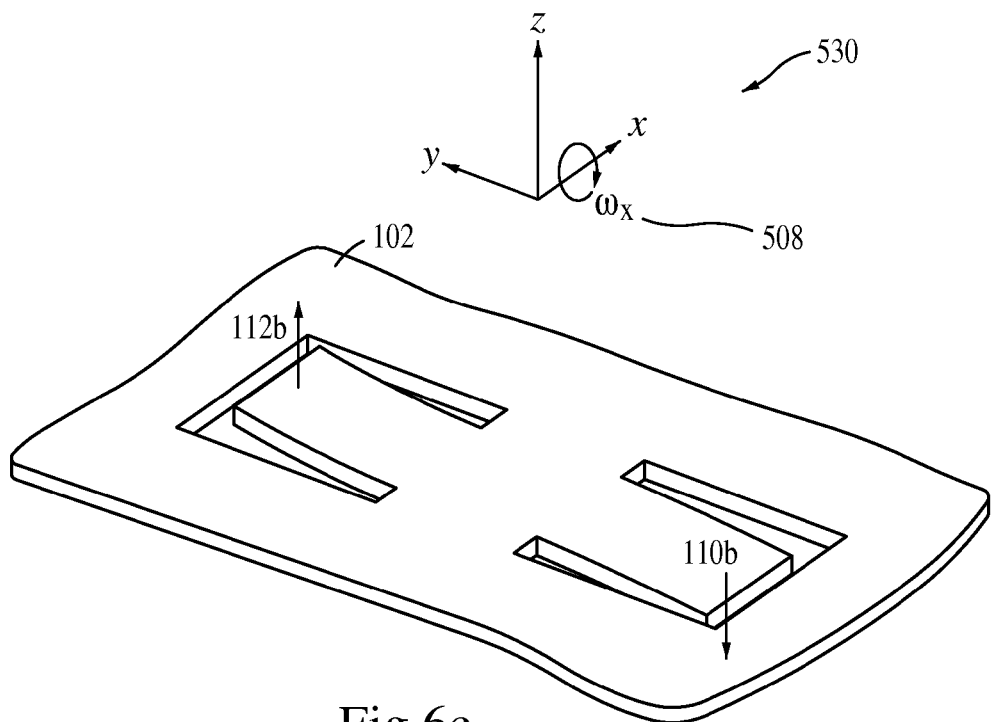

During the second half of the motion of the out-of-place motion of FIG. 6a, shown in FIG. 6c, the motion of 110a and 112a is reversed, as indicated with 110b and 112b. As a result for the angular rate $\infty_x$ 508 the resulting Coriolis force causes an extensional motion of the cantilevers, illustrated in FIG. 6d, with the motion 120b and 122b, respectively.

Figure 6D:
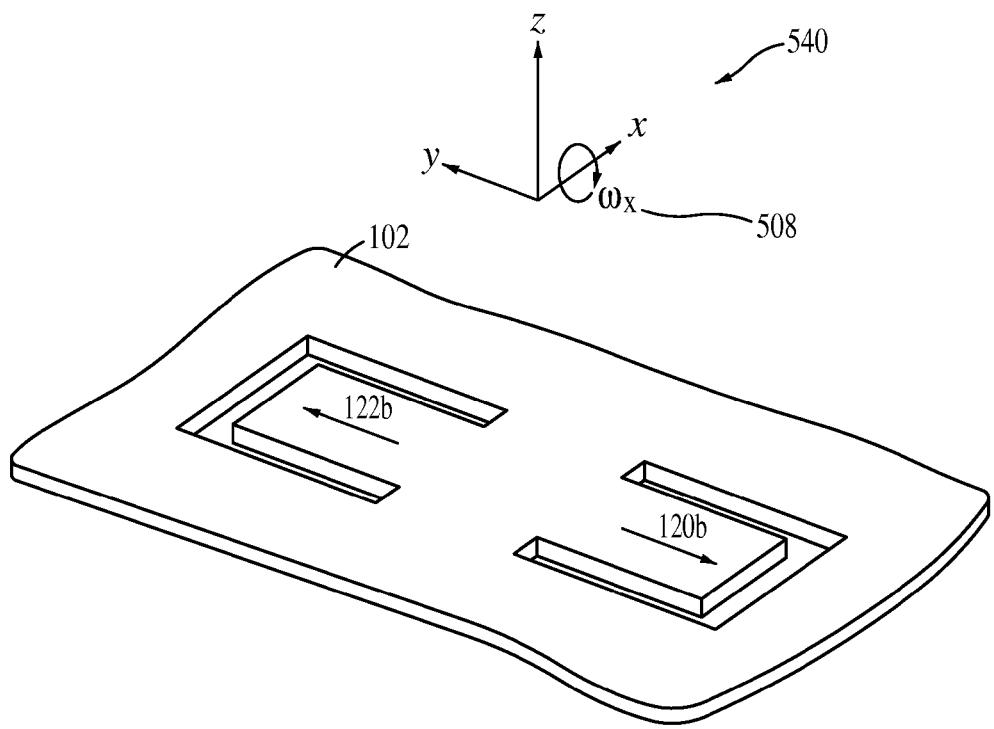

The sequence in FIGS. 6a-6d is intended to illustrate the relationship of how the angular rate causes the initial motion (FIGS. 6a and 6c) to excite the orthogonal motion (FIGS. 6b and 6d).

In principle, instead of using the initial motion (FIGS. 6a and 6c), the principle can be reversed and the motion (FIGS. 6b and 6d) can be used instead. As seen later, this will depend on the operating scheme and whether one of these modes is operated at its resonance frequency. In general, the resonance frequency of the flexural mode (FIGS. 6a and 6c) is lower than the extensional mode (FIGS. 6b and 6d). Therefore, if the exciting mode is driven at resonance using the extensional mode, with the higher resonance frequency, the sensing mode, in this case the flexural mode, would not be able to follow the high frequency and therefore only show a very small amplitude.

Although the embodiments illustrated in FIGS. 2-6 use both a fundamental extensional mode and a fundamental flexural mode, higher order modes can be used for the extensional and/or flexural modes. Higher order modes feature more than one node, or location of zero displacement, along the length of the cantilever and are thus higher in frequency. Using a higher order flexural mode would bring the mode frequencies closer together, increasing the amplitude of the sense mode. An appropriate choice of geometry can result in substantially equal flexural and extensional frequencies, sometimes referred to as a "mode-matched condition". Mode matching can often result in optimal mode coupling for a given gyroscope design.

Achieving mode matching, however, can often be difficult due to manufacturing limitations without frequency tuning. One possible approach is to combine piezoelectric excitation and sensing with electrostatic tuning. For example, a higher-order flexural mode can be selected to be higher in frequency than the extensional mode, and a DC voltage can be applied between a layer and a substrate (e.g., similar to the layer 404 and the substrate 408 of FIG. 4). The applied voltage would lower the stiffness, and thus the frequency of the flexural mode, and the applied voltage could be increased until the flexural mode frequency is substantially equal to that of the extensional mode. In such an alternative embodiment, both the layer and the substrate (similar to layer 404 and substrate 408) should be conductive, e.g., by doping or by deposition of a conductive material. This approach can reduce or eliminate the need to pattern the substrate (the substrate 408) or any layers deposited directly on top of it, simplifying the process flow.

Figure 7A:
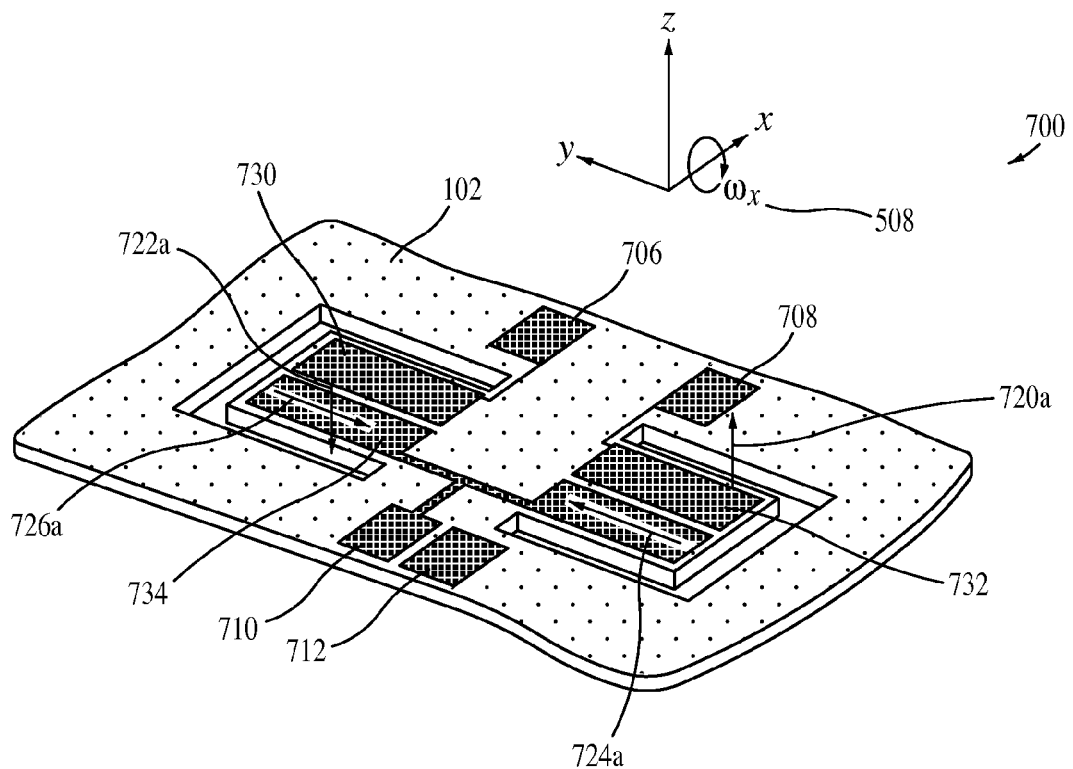
FIGS. 7a and 7b show perspective views of a gyroscope with actuation and sensing using the out-of-plane mode as the exciting mode, according to an embodiment.
Figure 7B:
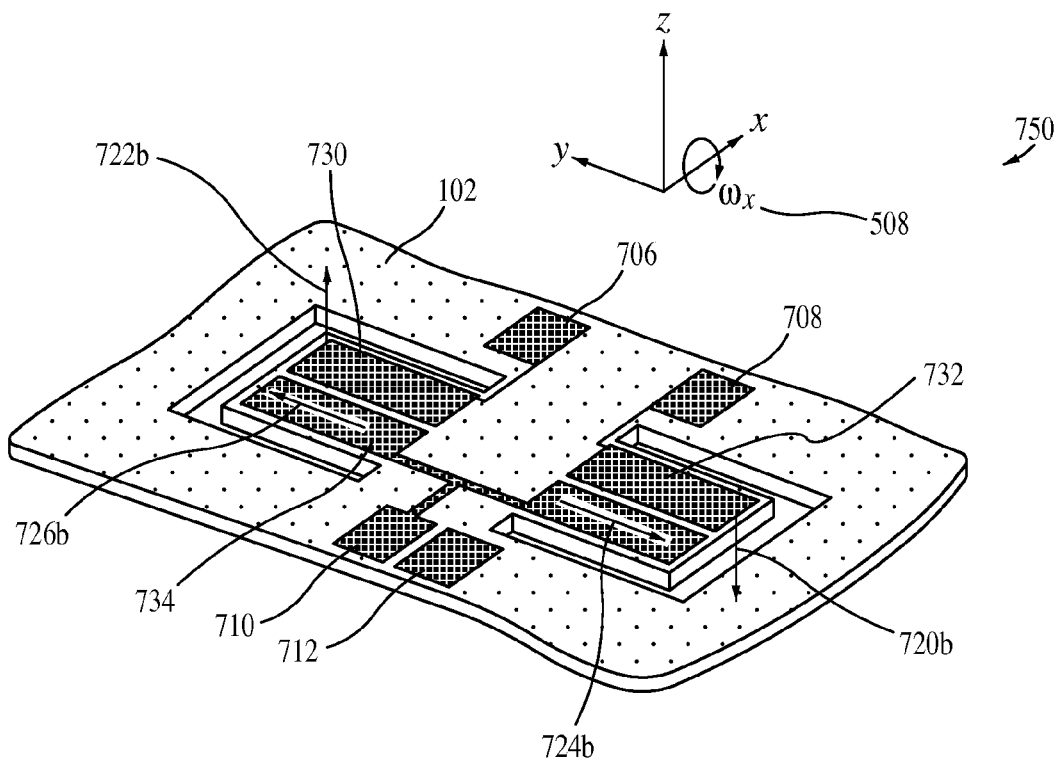
Figure 8A:
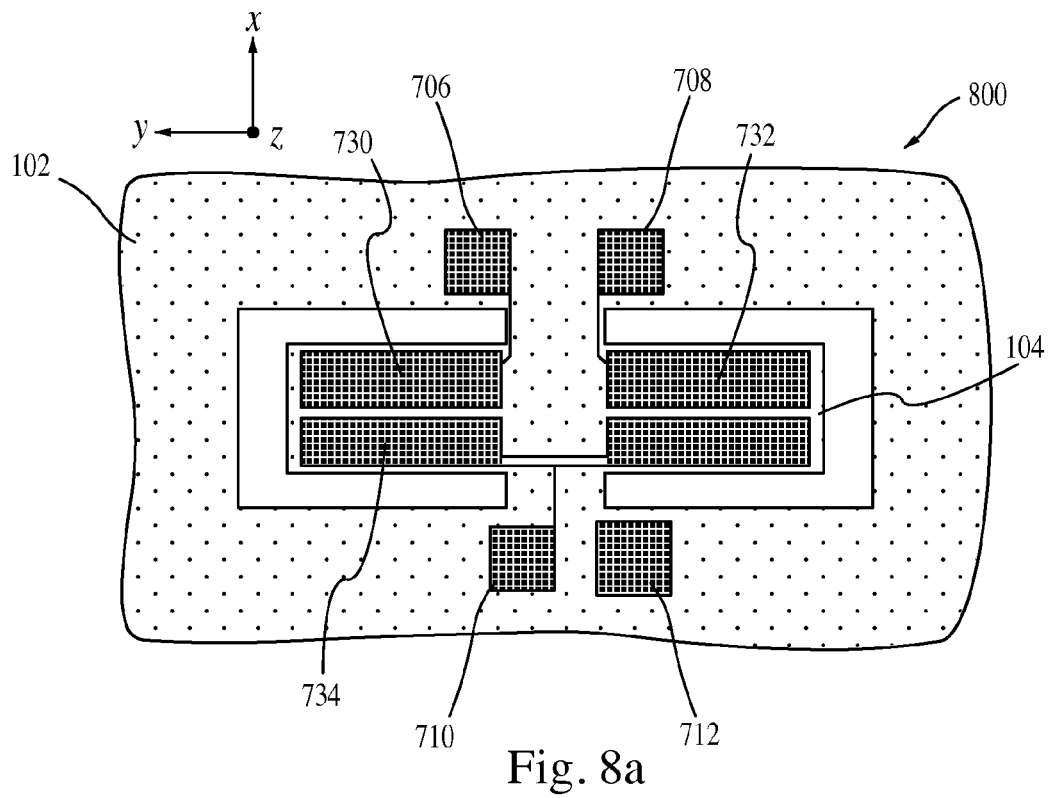
FIGS. 8a-8d show top views of embodiments having different electrode geometries.
Figure 8B:
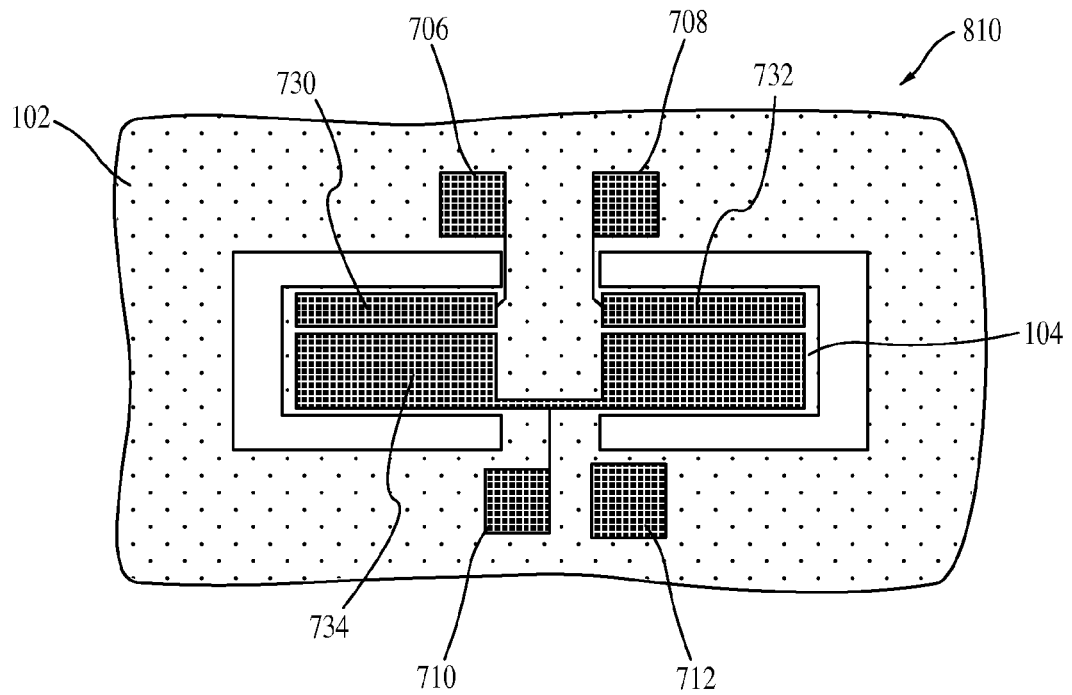
Figure 8C:
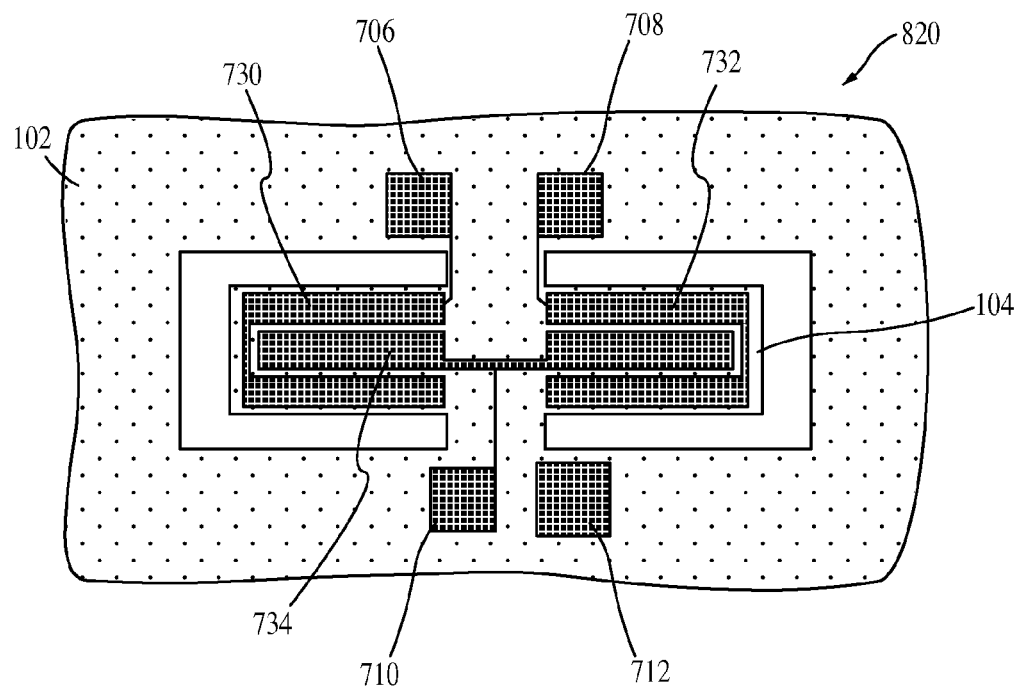
Figure 8D:
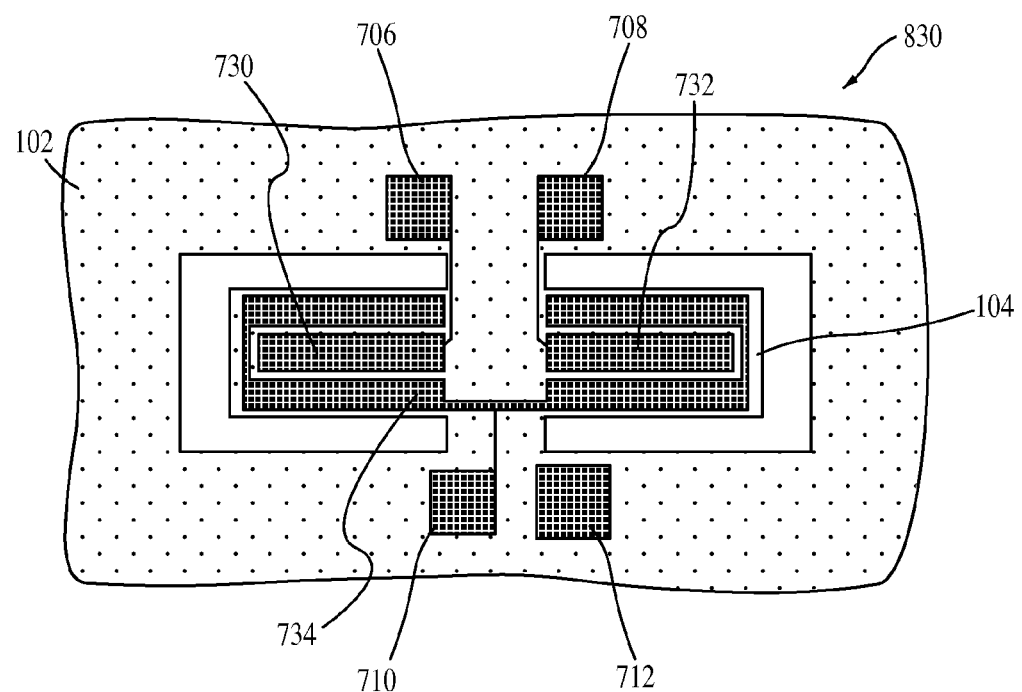

As discussed above in reference to FIGS. 4a and 4b and FIGS. 5a and 5b, a piezoelectric thin film can be used to excite the flexural and extensional mode using the inverse piezoelectric effect. Both structures can also be operated as a sensor to sense the existence of these respective modes using the direct piezoelectric effect. To use the illustrated principle of excitation and sensing of the two orthogonal modes illustrated in FIG. 6a-6d, we now combine the electrode configurations of FIG. 4a and FIG. 4b to obtain a new structure 700 illustrated in FIGS. 7a and 7b. We will assume that the flexural motion is the driven motion, indicated by the arrows 720a and 722a. This motion is excited via the inverse piezoelectric effect and the application of an alternating voltage to the pads 706 and 708 connected to the electrodes 730 and 732. The other halves of the cantilevers are covered by the electrode 734 that is used in this case to sense the extensional motion.

For the case of no angular rate, i.e., $\infty_x$ 508 being zero, no Coriolis force exists. In this case, the cantilevers are excited in the flexural mode. This motion does not produce any net signal on the extensional electrode 734 because the piezo-electrically-induced charges cancel each other due to the symmetric layout of the electrode 734. As a result for the angular rate $\infty_x$ 508 being zero, no voltage or current can be detected between the output pads 710 and the ground pad 712.

In reality, small asymmetries during the fabrication or cross-talk induces a small signal in the output electrode despite the angular rate being zero. The amplitude of this unwanted signal, however, does not depend on the Coriolis force and as a result can be easily dealt with by the circuit or by signal processing to compensate for these small asymmetries.

In case of a non-zero angular rate $\infty_x$ 508, the Coriolis force in combination with the actively driven flexural mode will cause the cantilevers to exhibit an extensional motion, as shown in FIGS. 6a-6d. During the first half cycle, illustrated in FIG. 7a, the flexural motion of 720a and 722a cause a contraction of the plate along 724a and 726a. During the latter half cycle, the direction 720b and 722b of the flexural mode is reversed and the plate through the Coriolis force experiences the extension according to 724b and 726b. The extensional motion piezoelectrically induces charges on the electrode 734. As a result of the angular rate $\infty_x$ 508 being non-zero, a voltage or current can be detected between the output pads 710 and the ground pad 712.

The layout of the electrodes 730, 732 and 734 can allow excitation of one mode and at the same time allow detection of the orthogonal mode excited through the angular rate and the Coriolis force, without producing cross-talk between these two modes. To reduce cross-talk, or increase the amplitude of the sense electrode and prevent any asymmetric motion of the plate, the electrode geometries 730, 732 and 734 can be improved or optimized. Four basic designs are illustrated in FIGS. 8a-8d.

Figure 9:
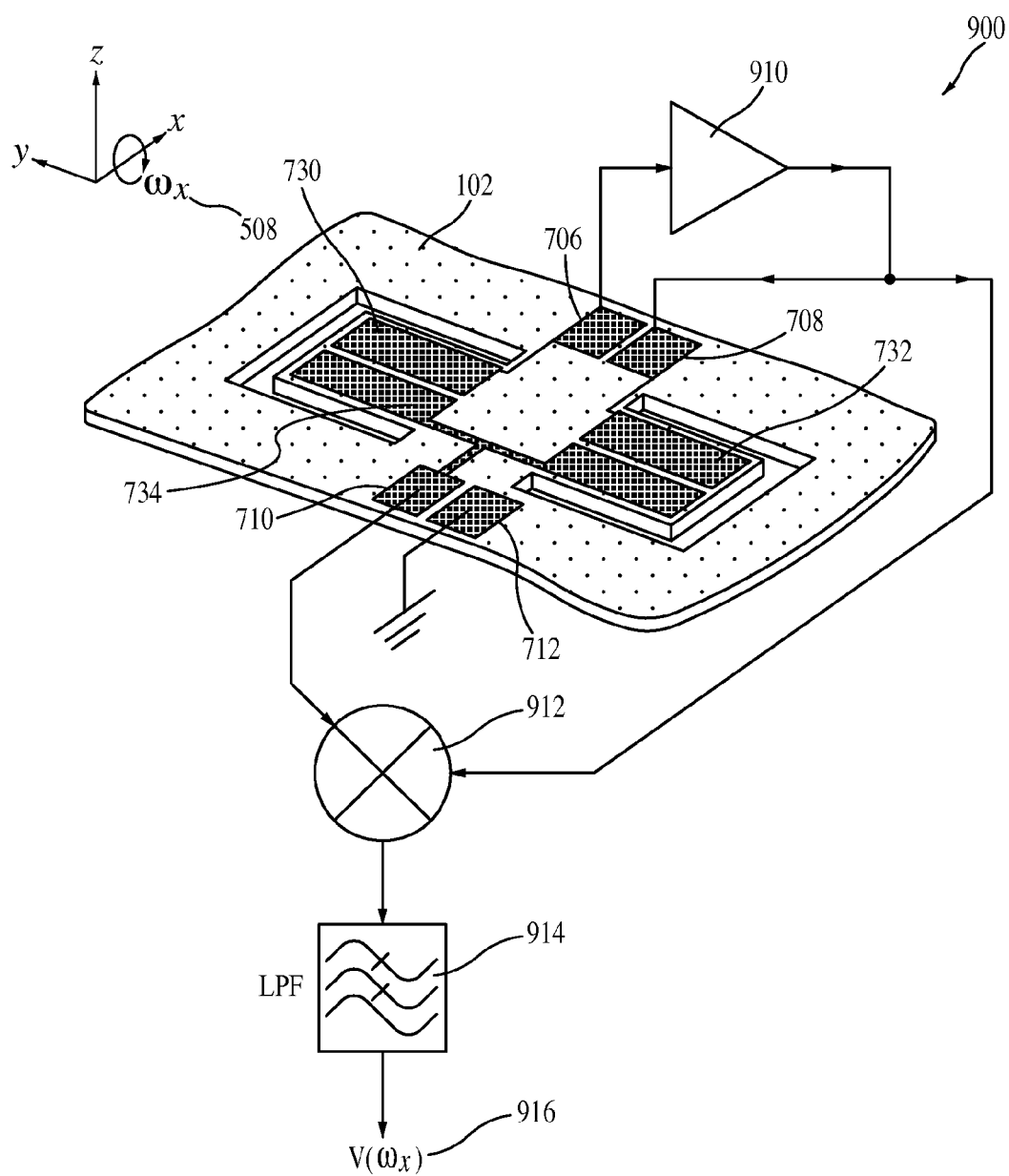
FIG. 9 shows a perspective view of a structure configured to oscillate in the out-of-plane mode at its natural frequency and a system block diagram of a circuit configured to detect and perform signal processing to obtain a voltage proportional to the angular rate, according to another embodiment.

FIG. 9 provides one possible embodiment of a schematic of how the output signal is processed to arrive at an output voltage $V(\infty_x)$ that is proportional to the angular rate $\infty_x$. A positive gain feedback loop (e.g., a circuit having amplifier 910) is used to sustain the oscillation of the flexural mode by sensing and applying voltage through the pads 706 and 708. This allows the flexural mode to be driven at its resonance f.sub.0 at all times, even if temperature change causes the resonance frequency f.sub.0 shifts. Because the driven mode will oscillate at the natural frequency f.sub.0 of the flexural mode, the precise manufacturing is not critical. The output voltage on pad 710 corresponds to the harmonic voltage induced through the Coriolis force proportional to the angular rate $\infty_x$ 508 acting on the flexural mode. The output voltage therefore is a harmonic sinusoidal with frequency f.sub.0 with the amplitude proportional to the angular rate $\infty_x$ 508. By mixing the driving signal and the output signal in the mixer 912 and using a subsequent low pass-filter 914, the sensor output voltage $V(\infty_x)$ 916 is obtained. This technique is similar to the operation principal of a lock-in amplifier, so that the output voltage $V(\infty_x)$ 916 can be interpreted as the cross correlation between the driving signal and the sense signal. The output voltage $V(\infty_x)$ 916 is directly proportional to the amplitude of the voltage oscillation from the extensional motion.

The schematic shown in FIG. 9 illustrates one embodiment. A simpler technique can use a rectifier and a low pass filter to obtain a DC voltage that is proportional to the Coriolis force. This simpler method, however, has several disadvantages. In a real environment, noise as well as mechanical shock and acceleration can induce unwanted signals on the sense electrode. In the advanced method shown in FIG. 9, the drive and sense are correlated and therefore only the signal modulated with $f_0$ is effectively detected. This makes this design very sensitive by eliminating noise sources, and robust to mechanical shock and vibration. The drift in known gyroscopes is in general the limiting factor, which is a combination of an erroneous output signal originating from acceleration, vibration, shock and noise. Using the proposed technique, the gyroscope here can be not only more robust and show less drift, but by using the correlation technique, the noise level can be reduced and a much higher sensitivity can be obtained.

Figure 10:
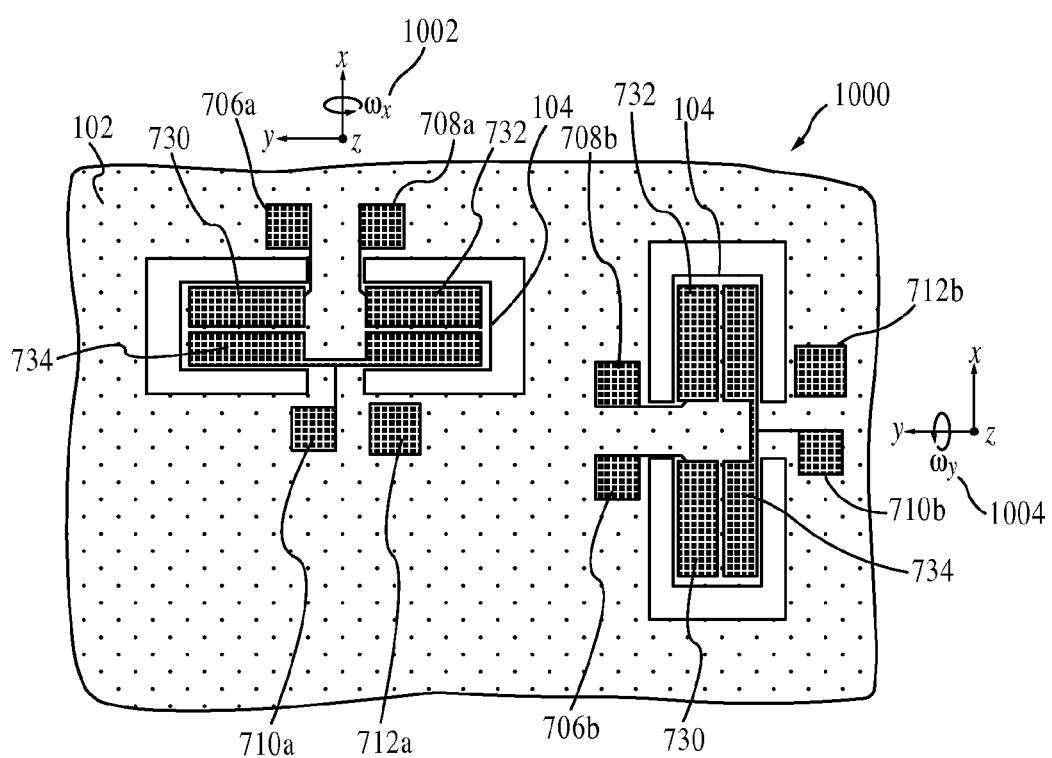
FIG. 10 shows a top view of a structure having two gyroscopes combined to define a sensor that can sense angular rates about the x and y axis, according to another embodiment.

Gyroscopes are of great commercial interest and, generally, integrated solutions are available for 1-axis, 2-axis or 3-axis gyroscopes, specifying whether the angular rate about one, two or three axes can be measured with one sensor. In the preceding paragraphs, the embodiments based on an angular rate about the x-axis, if the embodiments are aligned along the x-axis instead of the y-axis, they become sensitive to angular rotation about the y-axis. Using two designs rotated by 90 degree to each other, a 2-axis gyroscope is possible. An example of such a 2-axis gyroscope is illustrated in FIG. 10.

A very similar mode of operation to the operation of the gyroscope described in FIGS. 6a-6d is shown in FIGS. 11a-11d. Instead of having two cantilevers, this structure comprises one plate 1104 (also referred to herein as a "member" or a "bar") that is anchored to the substrate 1102. The excitation of the torsional mode can be achieved either piezoelectrically or using electrostatic actuation. In the later case, the electrostatic actuation can be achieved either by electrodes placed underneath the plate, which are not shown, or by comb-drive electrodes attached to the plate, also not shown. Although the plate 1104 is shown with a particular shape, it should be understood that other shapes are possible including a square shape, circular shape, oval shape, etc.

As discussed above, the upward displacement 1110a of the right side of the plate and downward displacement 1112a of the left side of the plate occurs. The right side of the plate will experience the Coriolis force, resulting from the upwards motion 1110a and the angular rotation $\infty_x$ 1108, which causes the plate to experience a contracting force, illustrated in FIG. 10b 1120a. For the left side of the plate, the displacement 1112a together with the angular rate $\infty_x$ 1108 causes a contraction, as illustrated in FIG. 11b 1122a.

Figure 11A:
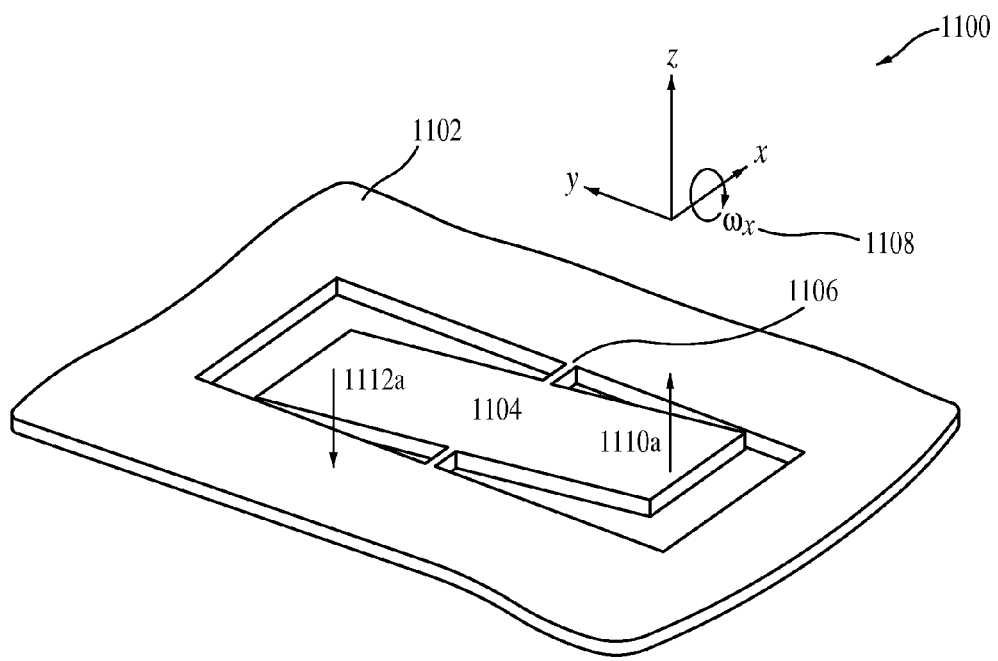
FIGS. 11a-11d show perspective views of a structure during an operational sequence based on a torsional mode and using the torsional mode as the exciting mode.
Figure 11B:
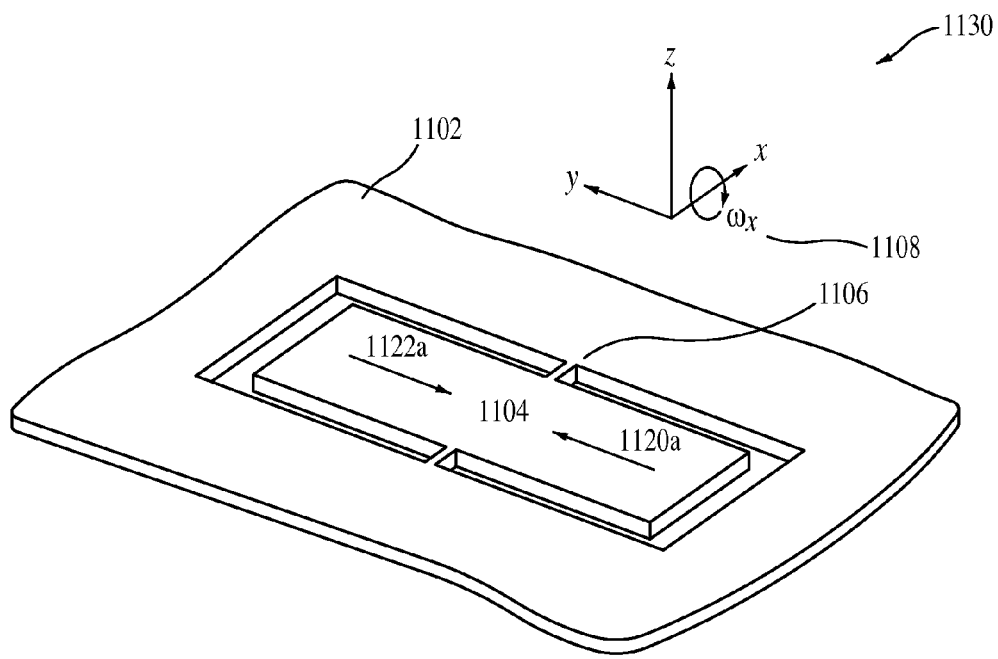
Figure 11C:
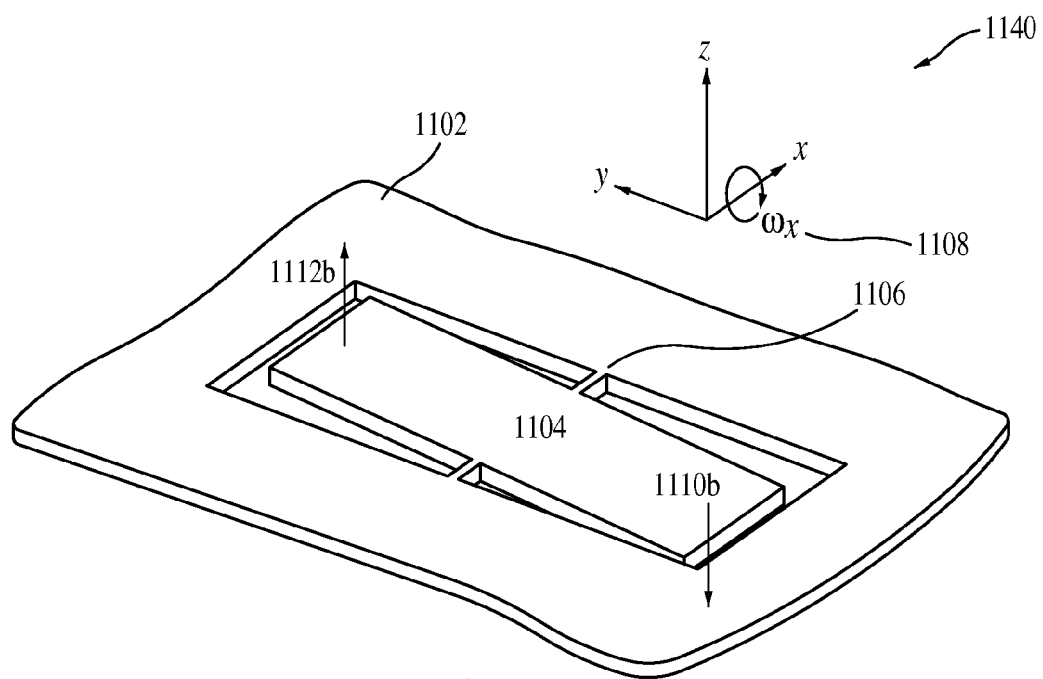

During the second half of the motion of the torsional motion of FIG. 11a, shown in FIG. 11c, the motion of 1110a and 1112a is reversed, as indicated with 1110b and 1112b. As a result for the angular rate $\infty_x$ 1108, the resulting Coriolis force causes an extensional motion of the plate, illustrated in FIG. 11d, with the motion 1120b and 1122b, respectively.

Figure 11D:
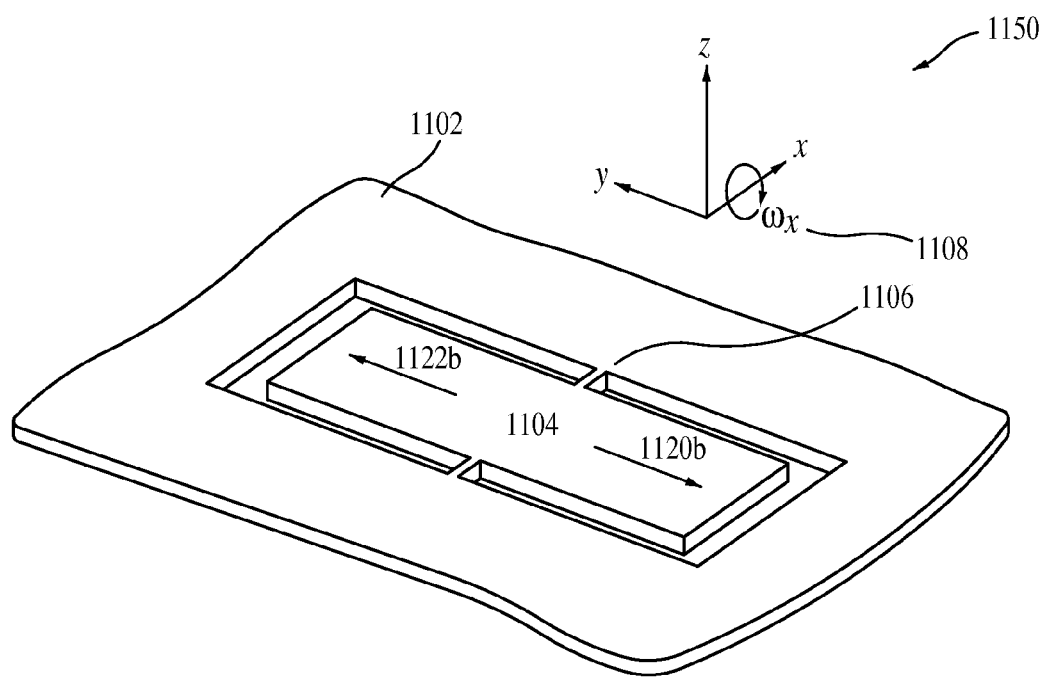

The sequence in FIGS. 11a-11d is intended to illustrate the relationship of how the angular rate causes the initial motion (FIGS. 11a and 11c) to excite the orthogonal motion (FIGS. 11b and 11d).

It should be understood that instead of using the torsional mode as the exciting mode the extensional motion can be used instead. As a result, the torsion motion can be detected as a result of the angular rate about the x-axis.

While various embodiments have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made. For example, although various embodiments have been described as having particular features and/or combinations of components, other embodiments are possible having any combination or sub-combination of any features and/or components from any of the embodiments described herein.

What is claimed is:

1. An apparatus, comprising:
    a substrate;
    a plate, comprising a piezoelectric material, suspended from the substrate and excitable by a gyroscopic effect, the plate having a thickness and including a temperature compensation structure including at least one layer that has a stiffness that increases with increasing temperature over a temperature range and at least one layer that has a stiffness that decreases with increasing temperature over the temperature range;
    a first electrode coupled to the plate and configured to excite a first mode of vibration in the plate; and
    a second electrode coupled to the plate and configured to sense a second mode of vibration in the plate.

2. The apparatus of claim 1, wherein the plate has a fundamental mode, and wherein first electrode is configured to excite a mode of higher order than the fundamental mode.

3. The apparatus of claim 1, wherein the first mode of vibration has a first frequency and the second mode of vibration has a second frequency lower than the first frequency.

4. The apparatus of claim 1, wherein the plate is made of at least one of silicon or silicon oxide.

5. The apparatus of claim 1, wherein the first electrode is configured to excite an extensional mode of vibration in the plate.

6. The apparatus of claim 1, wherein the piezoelectric material of the plate is a piezoelectric thin film, and wherein the plate further comprises a support on which the piezoelectric thin film is disposed, the support being formed of a material that is not piezoelectric.

7. The apparatus of claim 1, wherein the first electrode is one electrode of a first pair of electrodes configured to excite the first mode of vibration, and wherein the second electrode is one electrode of a second pair of electrodes configured to sense the second mode of vibration, and wherein the electrodes of the first pair of electrodes are disposed on a same side of the plate as each other, and wherein the electrodes of the second pair of electrodes are disposed on opposite sides of the plate from each other.

8. An apparatus, comprising:
a substrate;
a member, comprising a support and a piezoelectric material layer on the support, the member being moveably coupled to the substrate at a first anchor and a second anchor, the member being excitable by a gyroscopic effect and including a temperature compensation structure including at least one layer that has a stiffness that increases with increasing temperature over a temperature range and at least one layer that has a stiffness that decreases with increasing temperature over the temperature range; and
a circuit coupled to the member and configured to detect a gyroscopically-induced mode of vibration in the member.

9. The apparatus of claim 8, wherein the temperature compensation structure comprises at least three layers.

10. The apparatus of claim 8, wherein the support of the member is made of at least one of silicon or silicon oxide.

11. The apparatus of claim 8, further comprising a first pair of electrodes disposed on the member and configured to drive vibration of the member, and a second pair of electrodes coupled to the circuit and configured to sense the gyroscopically-induced mode of vibration.

12. The apparatus of claim 8, wherein the member includes a first piezoelectric thin film, a second piezoelectric thin film, and an electrode layer disposed between the first piezoelectric thin film and the second piezoelectric thin film.

13. An apparatus, comprising:
a micromechanical gyroscope configured to be excited by a gyroscopic effect, wherein the micromechanical gyroscope includes a multi-layer temperature-compensated stack having at least two different layers of different materials, the micromechanical gyroscope including a first electrode positioned to excite a first mode of vibration in the micromechanical gyroscope and a second electrode configured to generate a detection signal in response to a second mode of vibration of the micromechanical gyroscope; and
a circuit coupled to the micromechanical gyroscope and configured to detect the gyroscopic effect.

14. The apparatus of claim 13, wherein the multi-layer temperature-compensated stack includes a first layer of a first material and a second layer of a second material having a lower acoustical loss than the first material.

15. The apparatus of claim 14, wherein the first material comprises silicon dioxide.

16. The apparatus of claim 13, wherein the circuit provides a positive gain feedback loop when a drive signal is applied to the first electrode of the micromechanical gyroscope.

17. The apparatus of claim 13, wherein the first electrode is part of a first differential electrode pair disposed on a common surface of the micromechanical gyroscope, and wherein the second electrode is part of a second differential electrode pair, the second differential electrode pair including the second electrode and a third electrode positioned on a different layer of the micromechanical gyroscope than the second electrode.

18. The apparatus of claim 13, wherein the micromechanical gyroscope has a fundamental mode, and wherein the first mode of vibration is a higher order mode.

19. The apparatus of claim 18, further comprising a low-pass filter coupled to a mixer, the low-pass filter configured to output an output voltage responsive to a drive signal being applied to the first electrode of the micromechanical gyroscope.

20. The apparatus of claim 13, further comprising a first piezoelectric thin film, a second piezoelectric thin film, and an electrode layer disposed between the first piezoelectric thin film and the second piezoelectric thin film.

* * * * *